(12) United States Patent
Saggaf

(10) Patent No.: US 6,393,366 B1
(45) Date of Patent: May 21, 2002

(54) DECONVOLUTION OF SEISMIC DATA BASED ON FRACTIONALLY INTEGRATED NOISE

(75) Inventor: Muhammad M. Saggaf, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 81 days.

(21) Appl. No.: 09/611,437

(22) Filed: Jul. 7, 2000

(51) Int. Cl.⁷ .................................................. G01V 1/28
(52) U.S. Cl. ...................................................... 702/17
(58) Field of Search ............................ 367/43, 45, 46, 367/73; 702/14, 17

(56) References Cited

U.S. PATENT DOCUMENTS

| | | | |
|---|---|---|---|
| 3,689,874 A | * 9/1972 | Foster et al. | 367/40 |
| 4,715,021 A | * 12/1987 | Dittert | 367/41 |
| 4,780,859 A | * 10/1988 | Hadidi et al. | 367/43 |
| 4,853,903 A | * 8/1989 | Linville et al. | 367/39 |
| 4,884,247 A | * 11/1989 | Hadidi et al. | 367/43 |
| 5,010,525 A | * 4/1991 | Skinner et al. | 367/13 |
| 5,051,963 A | * 9/1991 | Linville et al. | 367/43 |
| 5,237,538 A | * 8/1993 | Linville et al. | 367/38 |
| 5,400,299 A | * 3/1995 | Trantham | 181/108 |

OTHER PUBLICATIONS

Reflections On Amplitudes, R. F. O'Doherty, N. A. Anstey, Geophysical Prospecting, 19, 430–458, 1971.
Fractional Differencing, J. R. M. Hosking, Biometrica, 1981, 68.1, p. 165–176.
Seismic Time–Invariant Convolutional Model, Enders A. Robinson, Geophysics, vol. 50, No. 12, Dec., 1985, pp. 2742–2752.

* cited by examiner

*Primary Examiner*—Donald E. McElheney, Jr.
(74) *Attorney, Agent, or Firm*—Abelman, Frayne & Schwab

(57) ABSTRACT

An improved method for the processing of data of seismic traces for the geophysical interpretation of the earth's subsurface employs deconvolution based on fractionally integrated white noise. A generalized form of deconvolution that more accurately models the earth's reflectivity applies the steps of (1) estimating the process order of the fractionally integrated noise model; (2) computing one or both of two correction filters based on the fractionally integrated noise model; and (3) applying one or both of the filters to the deconvolution processing of the seismic data. The resulting graphical displays based on the deconvolution processing more accurately portray the reflectivity and provide improved wavelet compression and signal resolution, thereby aiding in, and improving the interpretation of the subsurface strata.

16 Claims, 3 Drawing Sheets

FLOW DIAGRAM OF METHOD A. THE NUMBERS BETWEEN PARENTHESIS REFER TO THE SYSTEM OF EQUATIONS IN THE TEXT THAT NEEDS TO BE SOLVED TO COMPUTE THE FILTER.

FLOW DIAGRAM OF METHOD A. THE NUMBERS BETWEEN
PARENTHESIS REFER TO THE SYSTEM OF EQUATIONS IN THE TEXT
THAT NEEDS TO BE SOLVED TO COMPUTE THE FILTER.

FLOW DIAGRAM OF METHOD B. THE NUMBERS BETWEEN PARENTHESIS REFER TO THE SYSTEM OF EQUATIONS IN THE TEXT THAT NEEDS TO BE SOLVED TO COMPUTE THE FILTER.

PORTION OF A SEISMIC LINE WITH THE GENERALIZED FILTER BASED ON FRACTIONALLY INTEGRATED NOISE

PORTION OF A SEISMIC LINE WITH CONVENTIONAL DECONVOLUTION

DECONVOLUTION OF SEISMIC DATA BASED ON FRACTIONALLY INTEGRATED NOISE

FIELD OF THE INVENTION

This invention relates to the deconvolution of seismic data and specifically to the determination and application of filters to seismic traces and stacked data and the generation of graphic displays and representations from the data.

BACKGROUND OF THE INVENTION

Deconvolution is a process that is applied to seismic data to diminish the distortion effects of the seismic wavelet as the seismic signal travels through, and is reflected from, the subsurface strata, in order to recover the reflection coefficients from the seismic trace. Conventional deconvolution methods assume that the reflection coefficients have a white noise behavior, i.e., that they are uncorrelated random variables, with a flat power spectrum having a slope of zero and a spike auto-correlation function. A detailed discussion and description of conventional white noise deconvolution as practiced in the prior art is provided by E. A. Robinson and S. Treitel in Principles of Digital Weiner Filtering, *Geophysical Prospecting*, 15, page 311–333 (1967) and *Geophysical Signal Analysis*, Prentice-Hall (1980).

The assumption that the reflection coefficients have a random white noise behavior has been necessary as a practical matter in order to facilitate computations on the raw data, even though the reflection coefficients are observed in nature to depart from that model. However, this assumption of white noise behavior adversely affects the accuracy of the deconvolution process and use of that model limits analysis of the data recovered and displayed for interpretation to only the White component of reflectivity.

Various methods have been proposed and employed by the prior art for processing seismic data employing filters in an effort to improve the representations of the processed data. U.S. Pat. No. 3,689,874 discloses a seismic processing scheme employing conventional inverse filtering and smoothing techniques. U.S. Pat. No. 4,630,242 discloses two methods for estimating the earth's reflectivity sequence, the first based on Kalman filtering and the second on Weiner filtering and pilot auto-correlation data. U.S. Pat. No. 5,010,525 discloses a method for filtering noise bands from the data and U.S. Pat. No. 5,237,538 describes a method for filtering coherent noise bands from seismic a data. U.S. Pat. No. 4,884,247 describes a method that is essentially Q-filtering that compensates for the effects of attenuation on the wavelet's passage through the earth.

Numerous other methods have been proposed for improving the identification of stratigraphic prospects including the removal of sinusoidal noise from seismic data, U.S. Pat. Nos. 4,853903 and 5,051,963; the use of ceptral windows for deconvolution of the signal amplitude spectrum, U.S. Pat. No. 4,780,859; and the use of correlating signals to combine seismic data that have different spectral characteristics, U.S. Pat. No. 4,715,021.

Although some of these prior art methods have been adopted for the processing of seismic data to produce graphic representations and displays of the earth's strata, the resulting displays lack precision and completeness.

It is therefore a principal object of the invention to provide an improved method for the processing and analysis of seismic data that more accurately models the earth's reflectivity and performs a generalized form of deconvolution that takes into account the correct stochastic behavior of reflectivity.

Another principal object of the invention is to provide a method for the deconvolution of seismic data that is based on a fractionally integrated noise model of the earth's reflectivity.

Another object of the invention is to provide a method of processing seismic data to produce improved graphic displays of the seismic lines that represent the earth's strata.

Yet another object of the invention is to provide a method of processing seismic data based on the non-random stochastic behavior of reflectivity that is more accurate than the white noise model of reflectivity.

It is a further object of this invention to provide a method of defining a filter for processing seismic data that yields significantly more accurate output data and associated graphic displays than was possible employing the conventional filters of the prior art.

It is another object of the invention to provide an improved method of deconvoluting seismic data that more accurately represents the effects on the seismic wavelets of multiple reflections and that can be applied to both traces and to stacks.

SUMMARY OF THE INVENTION

The above objects and other benefits and advantages are attained by the method of the invention that models the earth's reflectivity by fractionally integrated noise and employs a generalized form of deconvolution that takes into account the correct stochastic behavior of reflectivity. The improved method yields significantly more accurate output, e.g., seismic line displays, than the conventional white noise filter of the prior art.

As used herein, the term "Fractionally Integrated Noise" means a fractal stochastic process that results from fractionally integrating white noise. It has a single parameter d, the process order, which describes its correlation behavior. The auto-correlation function can be represented by the following:

$$\rho_y(k) = \frac{\Gamma(1-d)\Gamma(k+d)}{\Gamma(d)\Gamma(k+1-d)} \qquad (1)$$

where $\rho_y(k)$ is the auto-correlation function at lag k, d is the process order, and $\Gamma$ is the Gamma function.

The power spectrum is represented by the following:

$$P_y(f) = \sigma^2 \sqrt{\pi} \frac{\Gamma(1-d)}{\Gamma\left(\frac{1}{2}-d\right)} \sin^{-2d}(\pi f) \qquad (2)$$

where $P_y$ is the power spectrum, $\sigma^2$ is the variance, the mean being assumed to be zero, and $f$ is the frequency normalized by the folding frequency (and hence, $0<f<\frac{1}{2}$). The power spectrum of equation (2) is normalized so that the process has unit variance.

The method of the invention can be conveniently divided into the following three principal steps:

1. estimating the order of the fractionally integrated noise model;
2. computing one or both of the correction filters based on the fractionally integrated noise model; and
3. applying one or both of the filters to the deconvolution processing of the data.

Following deconvolution processing of the data it can be displayed on a monitor and/or printed in the customary graphical representation for interpretation and analysis of the seismic lines.

As will be understood by those of ordinary skill in the art, the data resulting from the application of the filter(s) in step 3, above, can be subjected to further processing, e.g., stacking, prior to it being displayed.

As indicated in the above description of the invention, two different correction filters are provided, each of which can be utilized independently of the other, which gives rise to the implementation of two embodiments of the invention. For the purpose of further describing the invention, these filters are referred to as the "Reflectivity Whitening Filter" and the "Spectral Compensation Filter", which as used herein, have the following meanings: "Reflectivity Whitening Filter" is a filter that removes the non-white component of reflectivity from the trace, leaving only the white component in the trace, the function of this filter being to "whiten" the reflectivity sequence by retaining only the white component of reflectivity; the "Spectral Compensation Filter" is a filter that corrects the reflectivity sequence by compensating for the distortion induced in the spectral density by the conventional deconvolution method.

BRIEF DESCRIPTION OF THE DRAWINGS

The invention is described in more detail below and with reference to the attached drawings in which.

DESCRIPTION OF THE PREFERRED EMBODIMENTS

Figure 1:
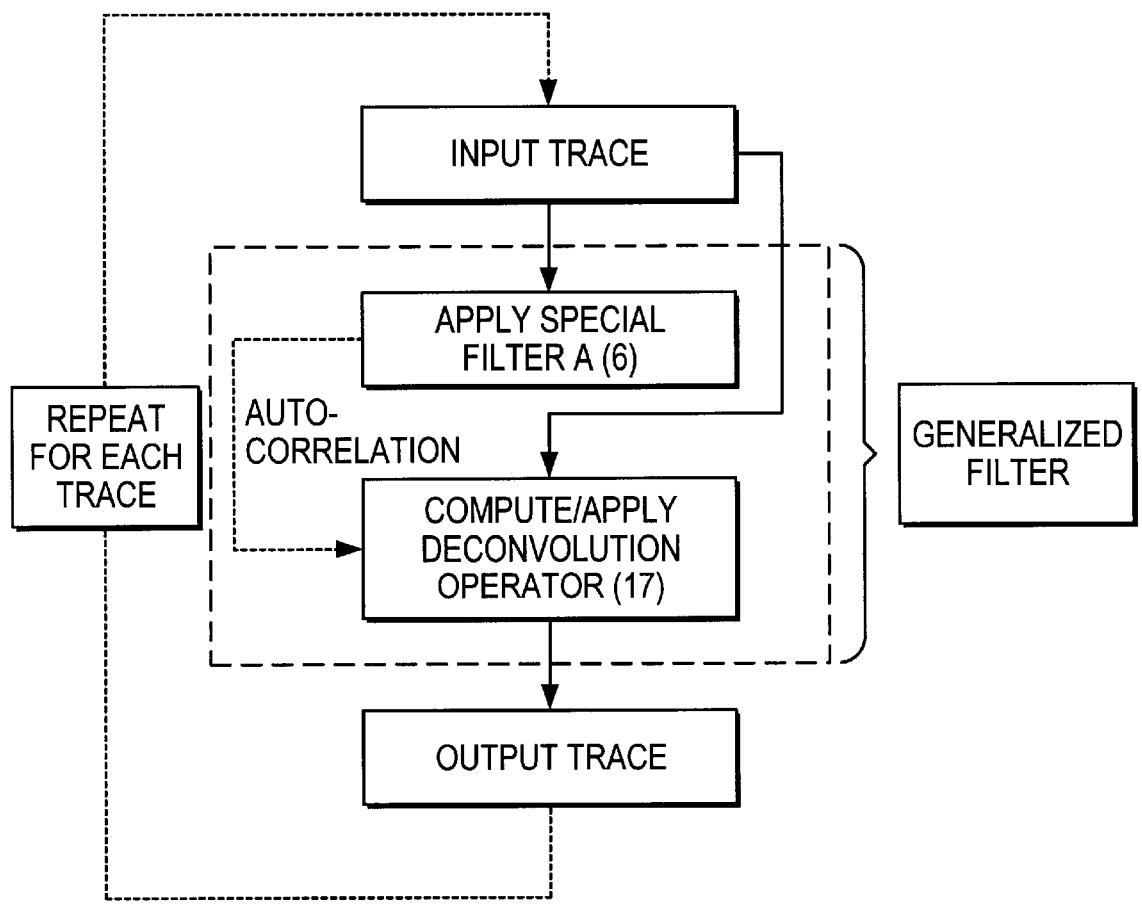
FIG. 1 a flow diagram schematically illustrating the application of one embodiment of the invention to seismic data.

The invention will be described with reference to the three principal steps set forth above.
Estimating the Process Order of the Fractionally Integrated Model To obtain the process order, d, of the fractionally integrated noise model for reflectivity in a given region where a well bore hole is relatively near, the method comprises the following steps:

a. Reflection coefficients are calculated using sonic and density log data from local wells.
b. The power spectrum of the reflection coefficients is computed.
c. The power spectrum of the fractionally integrated noise model is computed using Equation (2), above.
d. The power spectrum of reflectivity is fitted with that of the model process using the least-squares method of fitting.

The final step (d) provides the best-fitting model for reflectivity based on the geology of the region.

If there are no local wells in the region, or if no logs are available from local wells, the order of the fractionally integrated noise model is approximated as follows:

A. A regional estimate is made based on analysis of data from wells in the region, even if none of the wells are relatively close to the seismic line from which the data was recorded.

B. Iteration methodology is employed using different values for the order and selecting a value that gives improved output in the form of sharper reflections, better event continuity, and the like. This step can be performed by applying filters derived from various parameters to a subsection of the seismic line and inspecting the output, using a method similar to the panels used to estimate stacking velocity.

C. A subjective presumption is made, choosing the value from a reasonable interval. A reasonable interval is between $-\frac{1}{2}$ and $-\frac{1}{4}$, since typical reflection coefficients obtained from around the world have been determined to fall within that interval. A value of $-\frac{1}{2}$ is an appropriate value for initiating calculations.

Once the process order of the fractionally integrated noise model has been computed or estimated in accordance with one of the above methods, the correction filters are calculated.

2. Computing the Correction Filters

To implement the method of the invention for the fractal deconvolution of seismic data, either of two filters based on the fractionally integrated noise model are used. These filters are referred to as the Reflectivity Whitening Filter and the Spectral Compensation Filter, and the method for computing each of these filters follows.

A. Reflectivity Whitening Filter (Filter A)

The Reflectivity Whitening Filter ("Filter A") is denoted $f$ in the following expression (3):

$$f = (f_1, f_2, \ldots, f_m) \qquad (3)$$

where m is the desired length of the filter. To compute the filter coefficients ($f_i$, i=1,2, ..., m), the following system of equations is solved:

$$\sum_{k=1}^{m} f_k \bar{\phi}_r(j-k) = \delta(j), \quad j = 1, 2, \ldots, m \qquad (4)$$

where $\bar{\phi}_r(j-k)$ is the auto-correlation function at lag j-k as computed from (1), and $\delta(j)$ is defined as:

$$\delta(j) = \begin{cases} 1 & \text{for } j = 0 \\ 0 & \text{otherwise} \end{cases} \qquad (5)$$

Setting $a_{j-k} = \bar{\phi}_r(j-k)$ the system of equations (4) can be written in matrix notation as:

$$Af = \delta \qquad (6)$$

where:

$$f = \begin{pmatrix} f_1 \\ f_2 \\ \vdots \\ f_m \end{pmatrix}, \qquad (7)$$

$$\delta = \begin{pmatrix} 1 \\ 0 \\ \vdots \\ 0 \end{pmatrix}, \qquad (8)$$

$$A = \begin{pmatrix} a_0 & a_1 & a_2 & \cdots & a_m \\ a_1 & a_0 & a_1 & \cdots & a_{m-1} \\ a_2 & a_1 & a_0 & \cdots & a_{m-2} \\ & & & \vdots & \\ a_m & a_{m-1} & a_{m-2} & \cdots & a_0 \end{pmatrix} \quad (9)$$

Solving the system of equations (4) or (6) gives the filter coefficients and describes Filter A completely.

B. Spectral Compensation Filter (Filter B):

The Spectral Compensation Filter ("Filter B") is denoted g in the following expression (10):

$$g = (g_1, g_2, \ldots, g_m) \quad (10)$$

where m is the desired length of the filter. To compute the filter coefficients ($g_i$, i=1,2, ..., m), the following system of equations is solved:

$$\sum_{k=1}^{m} g_k \phi_f(j-k) = \delta(j), \quad j = 1, 2, \ldots, m \quad (11)$$

where $\phi_f(j-k)$ is the auto-correlation function at lag j−k of Filter A that was described above.

This auto-correlation function is defined as:

$$\phi_f(k) = E\{f_{t+k} f_t\} \quad (12)$$

where E is the expected value (mean) and $f$ is as computed above. Setting $b_{j-k} = \phi_f(j-k)$, the system of equations (11) can be written in matrix notation as:

$$Bg = \delta \quad (13)$$

where:

$$g = \begin{pmatrix} g_1 \\ g_2 \\ \vdots \\ g_m \end{pmatrix}, \quad (14)$$

$$B = \begin{pmatrix} b_0 & b_1 & b_2 & \cdots & b_m \\ b_1 & b_0 & b_1 & \cdots & b_{m-1} \\ b_2 & b_1 & b_0 & \cdots & b_{m-2} \\ & & & \vdots & \\ b_m & b_{m-1} & b_{m-2} & \cdots & b_0 \end{pmatrix}, \quad (15)$$

and δ is as defined above in connection with equation (8). Solving the system of equations (11) or (13) gives the filter coefficients and describes Filter B completely.

3. Applying the Filters for Deconvolution Processing of the Data

Following calculation of the Filter A and/or Filter B in accordance with the steps described above, each, or both, is separately applied in the deconvolution method of the invention to provide the generalized deconvolution. The two methods, each of which correspond to the use of either Filter A or Filter B, produce equivalent results and both produce improved graphical representations of the seismic lines having enhanced clarity and completeness. These two methods of practicing the invention are described in more detail below.

A. Method of Filter A:

This method utilizes the Reflectivity Whitening Filter (Filter A). Where the gather comprises a plurality of traces, the Reflectivity Whitening Filter is applied to each of the traces. A deconvolution operator it is computed from the modified trace by solving the system of equations:

$$\sum_{k=1}^{m} u_k \phi_a(j-k) = \delta(j), \quad j = 1, 2, \ldots, m \quad (16)$$

where m the length of the operator and $\phi_a(j-k)$ is the auto-correlation function at lag j−k of the output of Filter A.

Setting $c_{j-k} = \phi_a(j-k)$ the system of equations (16) can be written in matrix notation as:

$$Cu = \delta \quad (17)$$

where:

$$u = \begin{pmatrix} u_1 \\ u_2 \\ \vdots \\ u_m \end{pmatrix}, \quad (18)$$

$$C = \begin{pmatrix} c_0 & c_1 & c_2 & \cdots & c_m \\ c_1 & c_0 & c_1 & \cdots & c_{m-1} \\ c_2 & c_1 & c_0 & \cdots & c_{m-2} \\ & & & \vdots & \\ c_m & c_{m-1} & c_{m-2} & \cdots & c_0 \end{pmatrix}, \quad (19)$$

and δ is as defined above in connection with equation (8). Solving the system of equations (16) or (17) gives the operator coefficients and describes the operator completely. This operator is then applied to the original trace. A flow diagram of this method is shown in FIG. 1.

B. Method of Filter B:

This method utilizes the Spectral Compensation Filter (Filter B). For every trace in the gather, a deconvolution operator v is computed from the original trace by solving the system of equations:

$$\sum_{k=1}^{m} v_k \phi_r(j-k) = \delta(j), \quad j = 1, 2, \ldots, m \quad (20)$$

where m is the length of the operator and $\phi_r(j-k)$ is the auto-correlation function at lag j−k of the original trace. Setting , $d_{j-k} = \phi_r(j-k)$, the system of equations (20) can be written in matrix notation as:

$$Dv = \delta \quad (21)$$

where:

$$v = \begin{pmatrix} v_1 \\ v_2 \\ \vdots \\ v_m \end{pmatrix}, \quad (22)$$

$$D = \begin{pmatrix} d_0 & d_1 & d_2 & \cdots & d_m \\ d_1 & d_0 & d_1 & \cdots & d_{m-1} \\ d_2 & d_1 & d_0 & \cdots & d_{m-2} \\ & & & \vdots & \\ d_m & d_{m-1} & d_{m-2} & \cdots & d_0 \end{pmatrix}, \quad (23)$$

and δ is as defined above in connection with equation (8). Solving the system of equations (20) or (21) gives the operator coefficients and describes the operator completely.

Figure 2:
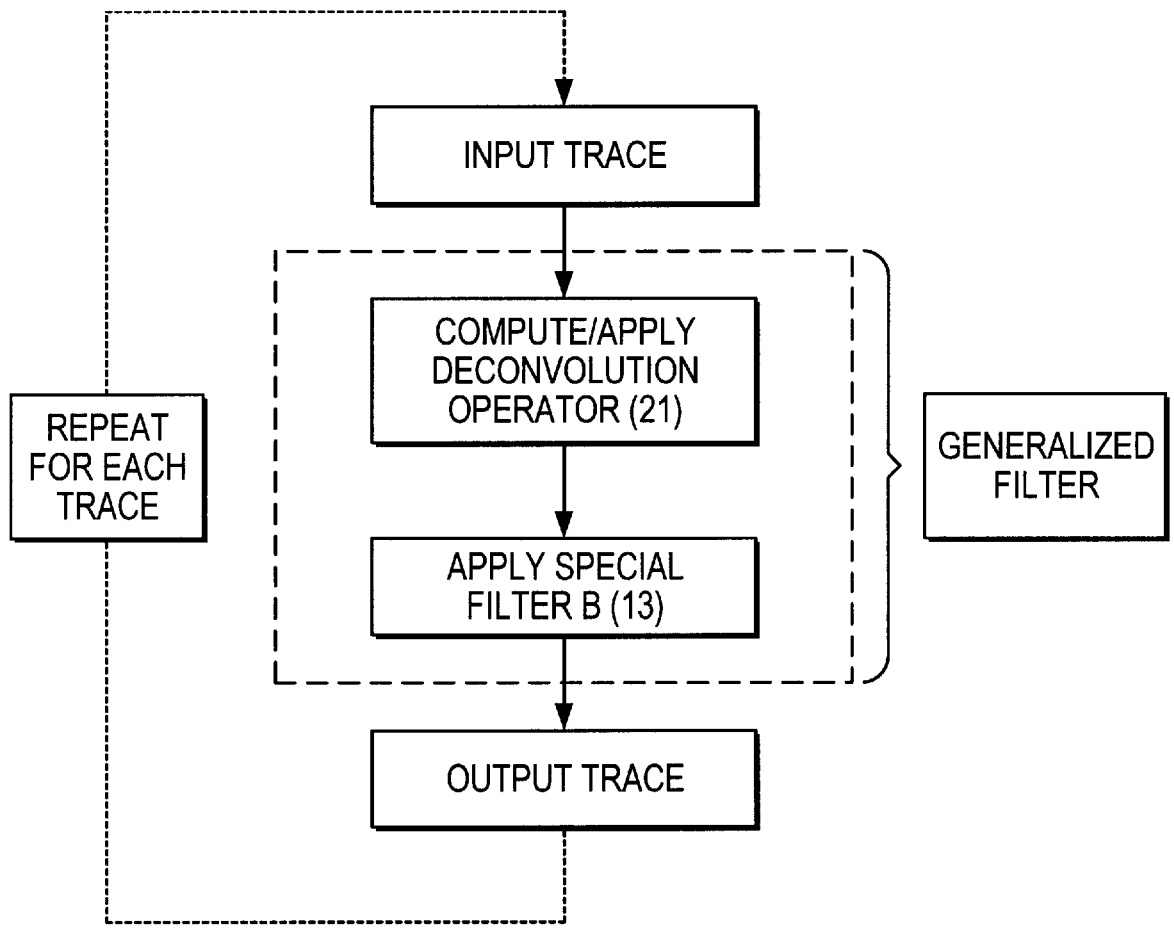
FIG. 2 is a flow diagram schematically illustrating the application of a second embodiment of the invention seismic data.

This operator is then applied to the original trace. The Spectral Compensation Filter is then applied to the output of this operator. A flow diagram of this method is shown in FIG. 2.

Both methods A and B produce equivalent output. Optimal results are obtained when the methods are applied to the traces at the pre-stacking stage. However, in order to reduce computing time and its associated expense, the Spectral Compensation Filter method (Filter B) can be applied after stacking rather than pre-stacking. This is because the Spectral Compensation Filter is trace invariant (it does not change from one trace to another) since it is not computed from the trace. Applying the filter after stacking does result in some reduction in accuracy, but still produces an output that is superior to that obtained by applying the deconvolution methods of the prior art.

Figures 3A, 3B:
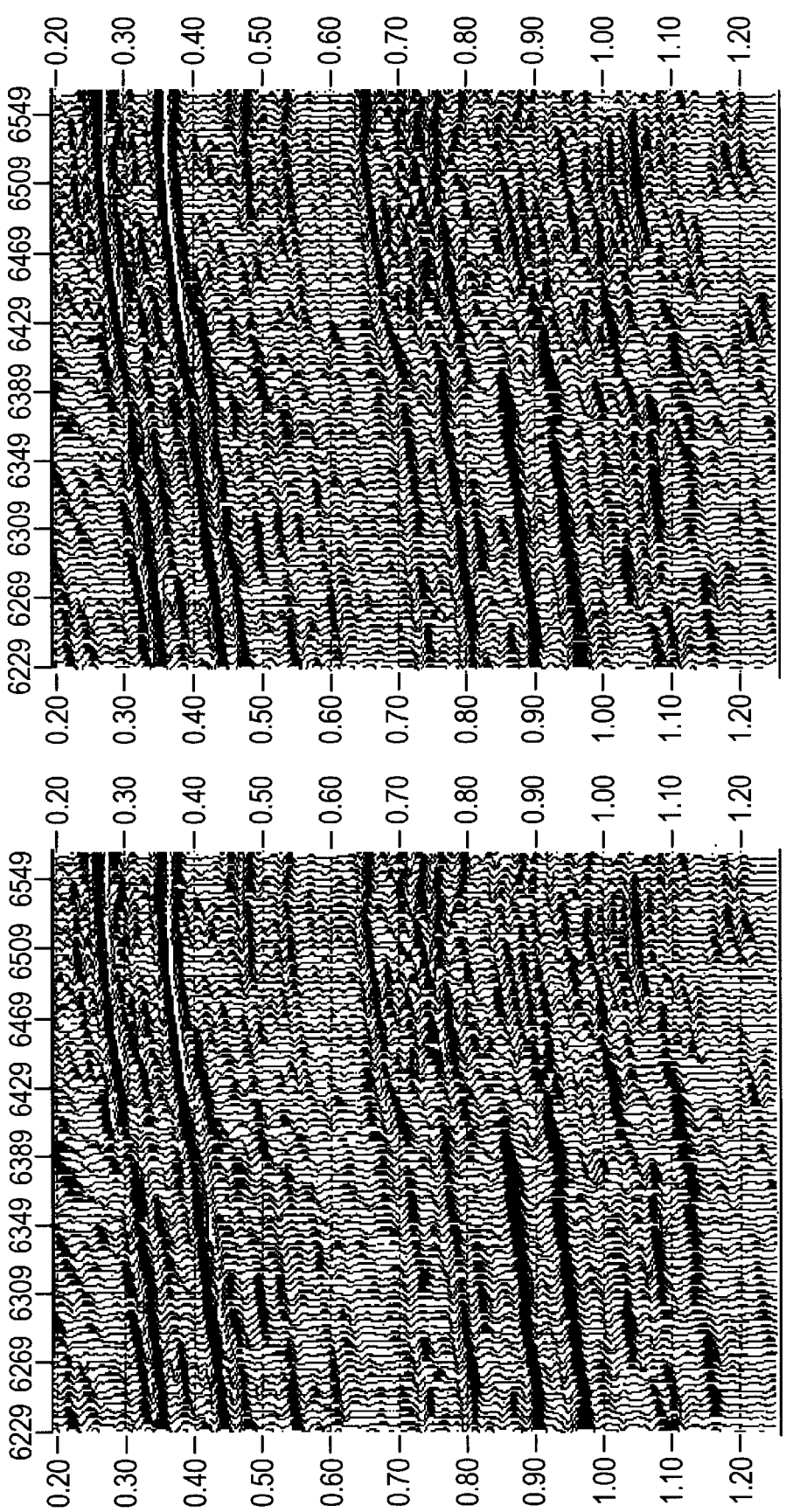
FIG. 3A is a portion of a seismic line prepared using a conventional prior art deconvolution method.
FIG. 3B is a portion of a seismic line prepared using the generalized filter based on fractionally integrated noise.

As can be seen from a comparison of the graphic representations of FIG. 3A employing the prior art method of deconvolution with that of FIG. 3B which employs the method of the invention, FIG. 3B provides a more accurate portrayal of the earth's reflectivity from seismic data and the graphic representations of seismic sections exhibit enhanced event continuity. Wavelet compression and signal resolution are also improved using the method of the invention. The filters of the invention were tested using synthetic data where the input model is controlled and the correct output is known. The results of the tests on synthetic data established that the generalized filters of the invention produced a significant improvement in the accuracy of deconvolution, as indicated by a sharp residual wavelet and a small RMS error between the recovered and actual reflection coefficients. The enhancements of the graphical representations produced by the invention aid in, and improve the interpretation of the subsurface strata.

In tests on actual seismic sections, some horizons that could scarcely be followed in the original section can be traced with ease after application of the improved method. Using the method of the invention, individual events that were compiled into a single event in the original section can be distinguished, and the data exhibits better resolution and a more compressed wavelet throughout the new section.

I claim:

1. A method for the generalized deconvolution processing of data of seismic traces based on a fractionally integrated noise model for stratigraphic interpretation of the earth's subsurface to provide a graphic representation of said data, the method comprising the steps of:
   a. estimating the process order of the fractionally integrated noise model;
   b. computing at least one correction filter selected from the group consisting of Reflectivity Whitening Filter and Spectral Compensation Filter;
   c. applying the at least one correction filter to the deconvolution processing of the seismic trace data; and
   d. displaying the deconvoluted seismic trace data graphically.

2. The method of claim 1 where the deconvolution processing is applied to individual seismic traces.

3. The method of claim 2 which comprises subjecting the data obtained from step c to further processing.

4. The process of claim 3 where the further processing includes stacking the data.

5. The method of claim 1 where the deconvolution processing is applied to stacked seismic traces.

6. The process of claim 1 where both the Reflectivity Whitening Filter and the Spectral Compensation are computed and both are applied to the seismic trace data.

7. The method of claim 6 where the deconvultion processing is applied to individual seismic traces.

8. The method of claim 6 where the deconvolution processing is applied to stacked seismic traces.

9. The method of claim 1 where the process order of the fractionally integrated noise model is computed using sonic and density log data from a local well, or wells.

10. The method of claim 9 where the process order is determined by the least-squares method of fitting the power spectrum of reflectivity for the fractionally integrated noise model with the power spectrum of reflectivity derived from data obtained from the local well, or wells.

11. The method of claim 1 where the value assigned to the process order of the fractionally integrated noise model is selected from values in the range from $-\frac{3}{4}$ to $-\frac{1}{4}$.

12. The method of claim 11 where the value assigned to the process order is $-\frac{1}{2}$.

13. The method of claim 1 where the Reflectivity Whitening Filter, $f$, is defined as (3):

$$f = (f_1, f_2, \ldots, f_m) \qquad (3)$$

where m is the desired length of the filter, and the filter coefficients $f_i$, where i=1,2,..., m, are computed by solving the system of equations (4) to describe the Reflectivity Whitening Filter:

$$\sum_{k=1}^{m} f_k \bar{\phi}_r(j-k) = \delta(j), \quad j = 1, 2, \ldots, m \qquad (4)$$

where $\bar{\phi}_r(j-k)$ is the auto-correlation function at lag j-k as computed from (1), and $\delta(j)$ is defined as (5):

$$\delta(j) = \begin{cases} 1 & \text{for } j = 0 \\ 0 & \text{otherwise} \end{cases} \qquad (5)$$

14. The method of claim 13 which further comprises the steps:

(a) setting the value in equation (4) of $\bar{\phi}_r(j-k) = a_{j-k}$, whereby $$Af = \delta \qquad (6)$$

where $$f = \begin{pmatrix} f_1 \\ f_2 \\ \vdots \\ f_m \end{pmatrix}, \qquad (7)$$

$$\delta = \begin{pmatrix} 1 \\ 0 \\ \vdots \\ 0 \end{pmatrix}, \qquad (8)$$

$$A = \begin{pmatrix} a_0 & a_1 & a_2 & \cdots & a_m \\ a_1 & a_0 & a_1 & \cdots & a_{m-1} \\ a_2 & a_1 & a_0 & \cdots & a_{m-2} \\ & & & \vdots & \\ a_m & a_{m-1} & a_{m-2} & \cdots & a_0 \end{pmatrix} \qquad (9)$$

(b) solving equation (6) to describe the Reflectivity Whitening Filter.

15. The method of claim 1 where the Spectral Compensation Filter, g, is defined as (10):

$$g=(g_1, g_2, \ldots, g_m) \tag{10}$$

where m is the desired length of the filter, and the filter coefficients $g_i$, where i=1,2,..., m, are computed by solving the system of equations (11) to describe the Spectral Compensation Filter:

$$\sum_{k=1}^{m} g_k \phi_f(j-k) = \delta(j), \quad j = 1, 2, \ldots, m \tag{11}$$

where $\phi_f(j-k)$ is the auto-correlation function of the filter of claim 8 at lag j–k and is defined as:

$$\phi_f(k) = E\{f_{t+k} f_t\} \tag{12}$$

where E is the expected mean value and $f$ is computed as described above.

16. The method of claim 15 which further comprises the steps:

(a) setting the value in equation (11) of $\phi_f(j-k) = b_{j-k}$, whereby $$Bg = \delta \tag{13}$$

$$g = \begin{pmatrix} g_1 \\ g_2 \\ \vdots \\ g_m \end{pmatrix}, \tag{14}$$

$$\delta = \begin{pmatrix} 1 \\ 0 \\ \vdots \\ 0 \end{pmatrix}, \text{ and} \tag{8}$$

$$B = \begin{pmatrix} b_0 & b_1 & b_2 & \cdots & b_m \\ b_1 & b_0 & b_1 & \cdots & b_{m-1} \\ b_2 & b_1 & b_0 & \cdots & b_{m-2} \\ & & & \vdots & \\ b_m & b_{m-1} & b_{m-2} & \cdots & b_0 \end{pmatrix}, \text{ and} \tag{15}$$

(b) solving equation (13) to describe the Spectral Compensation Filter.

\* \* \* \* \*